(12) United States Patent
Siegman et al.

(10) Patent No.: US 9,866,656 B2
(45) Date of Patent: Jan. 9, 2018

(54) SYSTEM AND METHOD FOR SINGLE KVM CLIENT ACCOMMODATING MULTIPLE DIFFERENT VIDEO COMPRESSION TECHNOLOGIES

(71) Applicant: AVOCENT HUNTSVILLE CORP., Huntsville, AL (US)

(72) Inventors: Craig S. Siegman, Pembroke Pines, FL (US); Joseph Amirthasamy, Plantation, FL (US); George N. Griffin, Coral Springs, FL (US)

(73) Assignee: AVOCENT HUNTSVILLE, LLC, Huntsville, AL (US)

( * ) Notice: Subject to any disclaimer, the term of this patent is extended or adjusted under 35 U.S.C. 154(b) by 213 days.

(21) Appl. No.: 14/411,143

(22) PCT Filed: Jun. 28, 2013

(86) PCT No.: PCT/US2013/048637
§ 371 (c)(1),
(2) Date: Dec. 24, 2014

(87) PCT Pub. No.: WO2014/005053
PCT Pub. Date: Jan. 3, 2014

(65) Prior Publication Data
US 2015/0207904 A1    Jul. 23, 2015

Related U.S. Application Data

(60) Provisional application No. 61/666,308, filed on Jun. 29, 2012.

(51) Int. Cl.
*H04L 29/06* (2006.01)
*G06F 17/22* (2006.01)
(Continued)

(52) U.S. Cl.
CPC ........ *H04L 69/162* (2013.01); *G06F 17/2247* (2013.01); *H04L 67/02* (2013.01);
(Continued)

(58) Field of Classification Search
CPC ... H04L 69/162; H04L 67/02; G06F 17/2247; H04N 21/64322
(Continued)

(56) References Cited

U.S. PATENT DOCUMENTS

| 7,865,620 B2 | 1/2011 | Kwon et al. | |
| 2002/0101367 A1* | 8/2002 | Geiger | H03M 7/30 341/51 |

(Continued)

FOREIGN PATENT DOCUMENTS

CN    101217557 A    7/2008

OTHER PUBLICATIONS

International Search Report and Written Opinion of the International Searching Authority for PCT/US2013/048637, dated Oct. 11, 2013; ISA/KR.

(Continued)

*Primary Examiner* — Suraj Joshi
(74) *Attorney, Agent, or Firm* — Harness, Dickey & Pierce, P.L.C.

(57) ABSTRACT

A method is disclosed for providing compressed video to a personal electronic device of a user using one of a plurality of different video compression protocols, and wherein the personal electronic device has a web browser. The method may involve using the personal electronic device to transmit a request for video content from a server via a remotely located controller. The controller may be used to serve up HTML5 client code to the browser. The browser may use the HTML5 client code to create a web socket connection with the server and to establish a web socket in the browser. The (Continued)

HTML5 client code, the web socket connection and the web socket may be used to receive the compressed video, and the HTML5 client code may be used to decompress the compressed video for display on the personal electronic device.

15 Claims, 2 Drawing Sheets

(51) Int. Cl.

| | | |
|---|---|---|
| *H04L 29/08* | (2006.01) | |
| *H04N 21/643* | (2011.01) | |
| *H04N 21/4782* | (2011.01) | |
| *H04N 21/2343* | (2011.01) | |
| *H04N 21/462* | (2011.01) | |
| *H04N 21/81* | (2011.01) | |
| *H04N 21/8543* | (2011.01) | |
| *H04N 21/239* | (2011.01) | |
| *H04N 21/4143* | (2011.01) | |
| *H04N 21/437* | (2011.01) | |
| *H04N 21/4402* | (2011.01) | |

(52) U.S. Cl.
CPC ..... *H04N 21/2343* (2013.01); *H04N 21/2393* (2013.01); *H04N 21/4143* (2013.01); *H04N 21/437* (2013.01); *H04N 21/4402* (2013.01); *H04N 21/4622* (2013.01); *H04N 21/4782* (2013.01); *H04N 21/64322* (2013.01); *H04N 21/8193* (2013.01); *H04N 21/8543* (2013.01)

(58) Field of Classification Search
USPC ........................................................ 709/217
See application file for complete search history.

(56) References Cited

U.S. PATENT DOCUMENTS

| | | | |
|---|---|---|---|
| 2007/0174429 | A1 | 7/2007 | Mazzaferri et al. |
| 2008/0060068 | A1* | 3/2008 | Mabayoje ............... G06F 21/31 726/9 |
| 2008/0162727 | A1 | 7/2008 | Kwon et al. |
| 2008/0282003 | A1* | 11/2008 | Holovacs ................ G06F 3/023 710/72 |
| 2010/0050089 | A1 | 2/2010 | Kim et al. |
| 2010/0281107 | A1* | 11/2010 | Fallows .................... G06F 9/54 709/203 |
| 2012/0124123 | A1 | 5/2012 | Pierce et al. |
| 2013/0047074 | A1* | 2/2013 | Vestergaard ............. G06F 3/14 715/234 |

OTHER PUBLICATIONS

Anonymous: "KVM switch—Wikipedia, the free encyclopedia", Jun. 25, 2012, XP055247190, Retrieved from the Internet: URL:https://en.wikipedia.org/w/index.php?title=KVM_switch &oldid=499283658 [retrieved on Mar. 2, 2016], p. 2-4.

Atkins Jr. Tab: "HTML5 Doctor—video+canvas=magic", Oct. 20, 2010, XP055247439, Internet Retrieved from the Internet: URL:http://html5doctor.com/video-canvas-magic/ [retrieved on Feb. 4, 2016] p. 1-5.

Anonymous: "Video streaming over websockets using JavaScript", Oct. 22, 2010, XP055247460, Retrieved from the Internet: URL: http://stackoverflow.com/questions/424, 1992/video-streaming-over-websockets-using-javascript [retrieved on Feb. 4, 2016], p. 1-3.

EPO Supplemental European Search Report for corresponding European Application No. 13809179.8 dated Feb. 1, 2016, 9 pages.

Chinese State Intellectual Property Office, 1st Office Action and Search Report in corresponding Chinese Patent Application No. 201380034422.4, dated May 17, 2017, 23 pages.

* cited by examiner

SYSTEM AND METHOD FOR SINGLE KVM CLIENT ACCOMMODATING MULTIPLE DIFFERENT VIDEO COMPRESSION TECHNOLOGIES

CROSS-REFERENCE TO RELATED APPLICATIONS

This PCT International Application claims benefit and priority to U.S. Provisional Patent Application No. 61/666,308 filed on Jun. 29, 2012. The entire disclosure of the above application is incorporated herein by reference.

FIELD

The present disclosure relates to systems and methods for delivering compressed video to a browser running on a user's electronic device. More particularly, the system and method relates to a single KVM vMedia client that is able to provide video content compressed using any one of a plurality of different video compression protocols, to a browser, and to determine the type of video compression being used, and to use an appropriate decompression engine to decompress the compressed video content.

BACKGROUND

The statements in this section merely provide background information related to the present disclosure and may not constitute prior art.

Present day keyboard, video and mouse (KVM) appliances and baseband management controllers (BMCs) allow a user to access remote servers and other devices by passing the keyboard, video and mouse signals between the user's device (typically a laptop, PC, tablet, smartphone, etc.) and the KVM appliance or BMC. For the purpose of discussion, the following examples will make reference only to a KVM appliance, but it will be appreciated that they are equally applicable to communication with a BMC.

The keyboard and mouse signals received by the KVM appliance are typically received in some network protocol, for example Ethernet protocol packets, and then converted to a format (e.g., USB) that the remote device can accept. Video from the remote device can be received by an intermediate dongle, converted into a network protocol (e.g., Ethernet protocol) and then passed on to the KVM appliance. The KVM appliance may then pass on the video to the user's device.

When video is compressed within the KVM appliance using a certain type of compression engine, it must be decompressed after being received by the user's browser using the same type of decompression engine. There currently are a number of different video compression protocols being used by various manufacturers. For example, Dambrackas Video Compression (DVC) is a proprietary video compression scheme of Avocent, Inc., which is a company of Emerson Network Power. Another well known compression scheme is JPEG. Still another is "Run Length Encoding" ("RLE"). It will be appreciated by those skilled in this art that various other compression protocols exist as well. In a data center, for example, one video server may serve up video content encoded with DVC while another video server uses JPEG to encode the video file content that it serves up. And still another video server may use RLE to encode the video file content that it serves up.

Previously implemented KVM appliances and BMCs were typically limited to serving up video using only a single video compression scheme. Accordingly, to accommodate multiple video compression schemes, multiple KVM clients would typically have been required. Fox example, this would have required multiple KVM appliances to be used, with each KVM appliance having one or more servers that each make use of a different compression engine. This would have required additional storage space and configuration information to be stored on the web server of a KVM appliance, which would also add development costs and additional maintenance costs.

With the recent development of HTML5, the ability to create and communicate via multiple "web sockets", outside of the HTTP connection, which can each form distinct communication paths, now exists. It will be appreciated that the WebSocket protocol provides bi-directional, full-duplex communication channels over a single TCP connection. It is implemented in both web browsers and web servers, although it may be used by any client or server application. It makes possible more enhanced interaction between a browser and a web site by providing a standardized way for a server to send content to the browser without being solicited by the client, and allowing for messages to be passed back and forth while keeping the connection open between the browser and the server. This allows bi-directional, ongoing communications to take place between a browser and the server without the polling that would otherwise be required using previously developed HTML protocols. Currently HTML5 is supported by several web browsers including Apple Corporation's SAFARI® web browser, Mozilla's FIREFOX® web browser, the Google CHROME® web browser, and INTERNET EXPLORER® version 10 from Microsoft Corp.

Another advantage of an HTML5 client is that it does not require any installation on a user's browser. This is because everything the web browser needs is downloaded at the time of execution (i.e., when the HTML5 client code is first served up to the browser). The challenge has been how to take advantage of this capability to provide a more robust KVM vMedia client that is able to deliver video that needs to be decoded using multiple different types of video decompression, via a single KVM vMedia client.

SUMMARY

In one aspect the present disclosure relates to a method for providing compressed video to a personal electronic device of a user using one of a plurality of different video compression protocols, and wherein the personal electronic device includes a web browser. The method may comprise using the personal electronic device to transmit a request for video content from a server via a remotely located controller. The remotely located controller may be used to serve up HTML5 client code to the browser. The browser may be caused to use the HTML5 client code to create a web socket connection with the server and to establish a web socket in the browser. The HTML5 client code, the web socket connection and the web socket may be used to receive the compressed video, and the HTML5 client code may be used to decompress the compressed video for display on the personal electronic device.

In another aspect the present disclosure relates to a method for providing compressed video to a personal electronic device of a user using one of a plurality of different video compression protocols, and wherein the personal electronic device includes a web browser. The method may comprise using the personal electronic device to transmit a request for video content via a remotely located controller.

The remotely located controller may be used to serve up HTML5 client code to the web browser of the personal electronic device. The HTML5 client code may include a port number and an address for the video server that the personal electronic device is requesting video content from. The browser may be caused to use the HTML5 client code to establish a web socket connection with the video server using the port number and the address provided in the HTML5 client code, and to establish a web socket in the browser. The video server may be used to compress the video content and to provide the video content in compressed form to the browser using the browser's web socket. The HTML5 client code may run in the browser and may determine a specific type of compression being used on the received video content, to decompress the video content using an appropriate decompression protocol, and to render the decompressed video content to the browser for display on the user's personal electronic device.

In still another aspect the present disclosure relates to a system for providing compressed video to a personal electronic device of a user using one of a plurality of different video compression protocols, and wherein the personal electronic device includes a web browser. The system may comprise a personal electronic device configured to perform a plurality of operations including transmitting a request for video content from a server via a remotely located controller. The device may receive from the remotely located controller HTML5 client code. The device may have a browser that uses the HTML5 client code to create a web socket connection with the server and to establish a web socket in the browser. The device may use the HTML5 client code, the web socket connection and the web socket to receive the compressed video and to decompress the compressed video for display on the personal electronic device.

BRIEF DESCRIPTION OF THE DRAWINGS

The drawings described herein are for illustration purposes only and are not intended to limit the scope of the present disclosure in any way.

DETAILED DESCRIPTION

Figure 1:
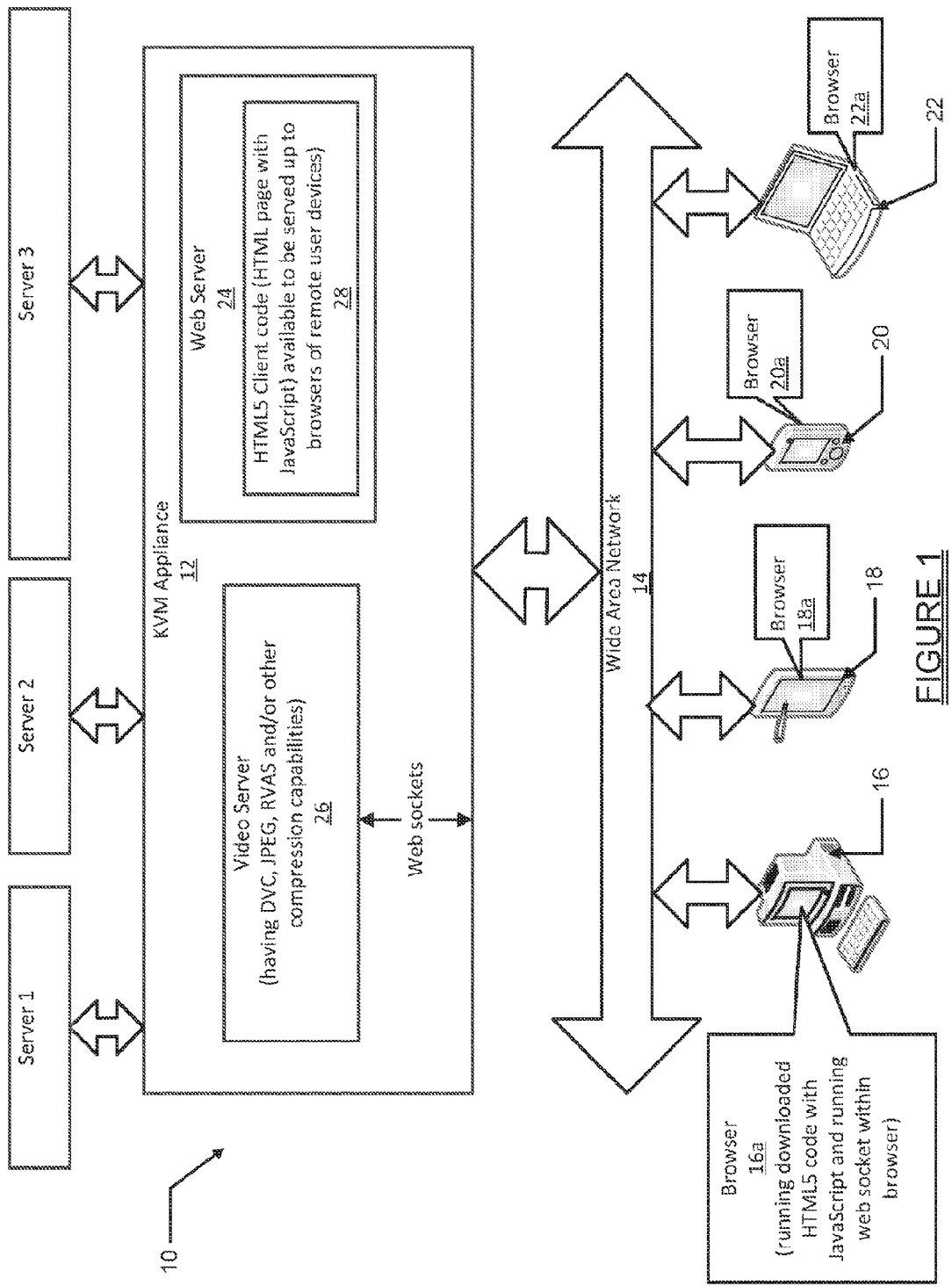
FIG. 1 is a block diagram of one example of a system in accordance with the present disclosure that makes use of a single HTML5 KVM client that can provide video to a user's browser which is coded using several different video decompression schemes.

The following description is merely exemplary in nature and is not intended to limit the present disclosure, application, or uses. It should be understood that throughout the drawings, corresponding reference numerals indicate like or corresponding parts.

Referring to FIG. 1, a system 10 in accordance with one example of the present disclosure is shown. The system 10 makes use of a KVM appliance 12 that is in communication with a plurality of servers, Server 1, Server 2 and Server 3. It will be appreciated immediately that instead of a KVM appliance a BMC could be used, but for the present discussion it will be assumed that a KVM appliance is being used.

The KVM appliance 12 in this example is also in communication with a wide area network (WAN) 14, for example the Internet. Different types of user electronic devices such as, without limitation, a workstation PC 16, a tablet 18, a smartphone 20 and a laptop 22 may be in communication with the KVM appliance 12 over the WAN 14. Each of the PC 16, tablet 18, smartphone 20 and laptop 22 may be running a browser 16a, 18a, 20a and 22a, respectively, thereon.

The KVM appliance 12 may include an internal web server 24 and a separate internal video server 26. The web server 24 may store HTML5 client code, which may form an HTML page with JavaScript code that may be served up to any of the browsers 16a, 18a, 20a or 22a, when the browser makes a request for content stored on any of Servers 1-3. The video server 26 may incorporate multiple different video compression schemes to handle compressing video content being requested by any of the browsers 16a-22a. In this example the video server 26 may have DVC, JPEG and RLE compression engines capable of compressing video content. The web server 24 may include HTML5 client code that may be served up to any of the browsers 16a-22a that makes a request for content from any of Servers 1-3.

When any of the user electronic devices 16-22 makes a request for content from any of the Servers 1-3, the HTML5 client code will be served up to the browser of the device 16-22 that made the request. This code will include JavaScript that will then run in the browser 16a-22a of the user's device 16-22. The browser 16a-22a will also include a web socket API. Depending on the specific content requested, the web server 24 will provide a port number (i.e., the web socket port number of the video server 26) and an address for the video server 26 when it provides the JavaScript code back to the browser. The browser 16a-22a will then use this information and its web socket API to make a web socket connection with the video server 26. Thereafter the video content will be obtained by the video server 26 from the appropriate Server (i.e., either Server 1, 2 or 3). The video content will be compressed by the video server 26 using the appropriate compression engine (e.g., DVC, JPEG or RLE), and then provided to the user's browser through the established web socket connection of the video server 26.

The above described system 10 provides a number of important advantages over previous systems. The ability to include one of a plurality of different video compression engines in one video server 26 that can be used as needed, eliminates the need to provide multiple HTML clients to handle different types of video compression engines. This eliminates the need for the additional storage space that would otherwise be required to set up multiple KVM clients within the KVM appliance 12. It also significantly simplifies configuration and reduces the overhead associated with creating, validating, tracking and maintaining a number of different client types.

Another important advance of the system 10 is that it also provides an HTML5 client that supports DVC compression. This capability did not exist prior to the system 10.

Figure 2:
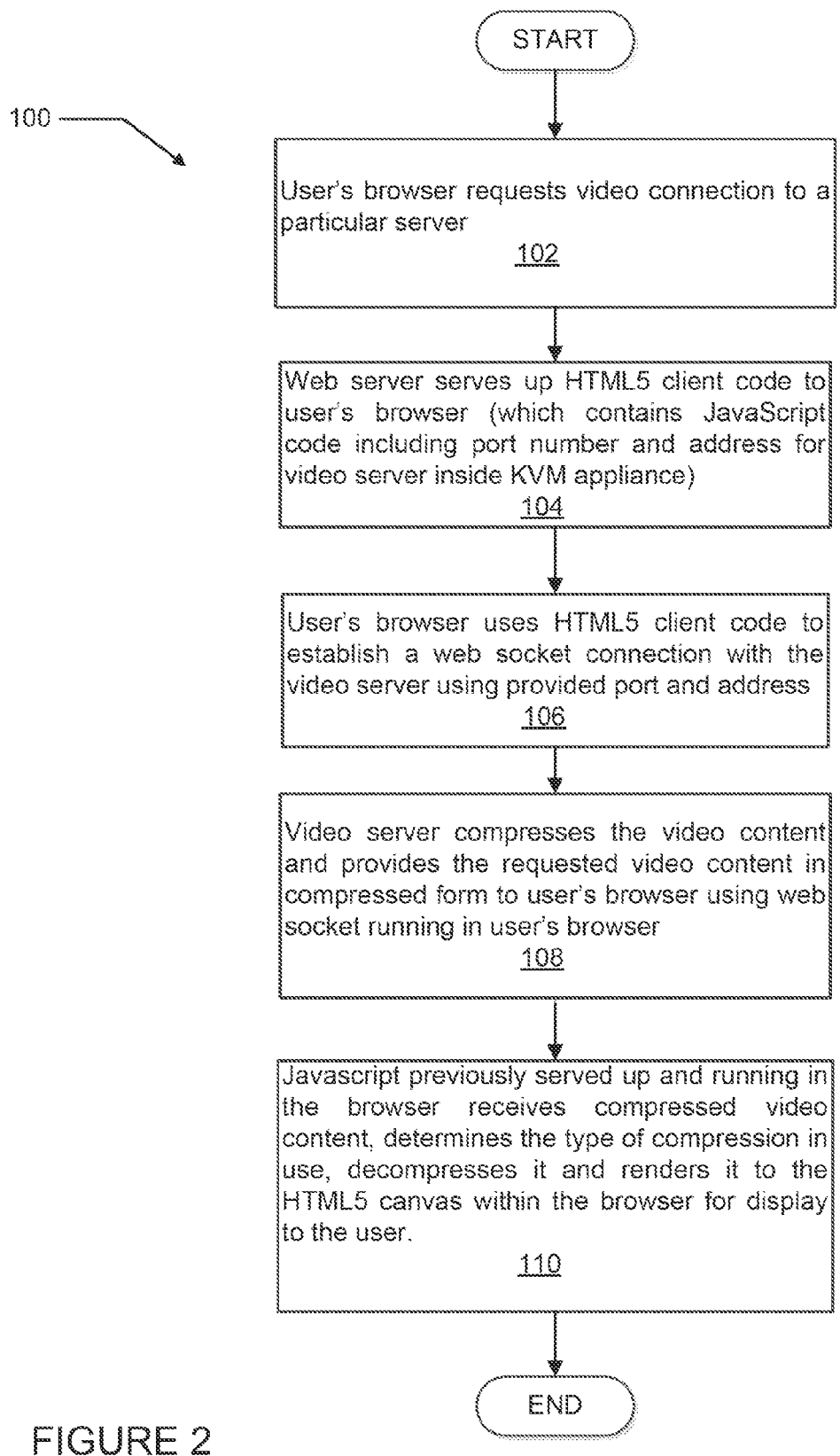
FIG. 2 is a flowchart showing one example of a sequence of operations that may be performed by the components shown in FIG. 1 to deliver compressed video to a user's browser, and such that the browser is able to decode the compressed video using the appropriate decompression engine.

Referring now to FIG. 2, a flowchart 100 is shown as an example of a communication sequence that may occur between any of the browsers 16a-22a and the KVM appliance 12. At operation 102 the user's browser requests a video connection to a particular server. In this example it will be assumed that the browser 16a of the PC 16 is making the request for video content from Server 1. The web server 24 serves up HTML5 client code to the browser 16a, as indicated at operation 104. The HTML5 client code contains JavaScript code that includes a port number and an address for the video server 26. At operation 106 the user's browser 16*a* uses the HTML5 client code and the web socket API to establish a web socket connection with the video server 26 using the provided web socket port and address information. At operation 108 the video server 26 compresses the video content obtained from Server 1, and also provides the video content, in compressed form, to the user's browser 16*a* using the web socket API running in the user's browser 16*a*.

At operation 110, the JavaScript previously served up and now running in the user's browser 16*a* receives the compressed video content and determines the type of compression in use. The JavaScript decompresses the video content using the appropriate decompression protocol and renders it to the HTML5 canvas within the browser 16*a*. The browser 16*a* then displays the decompressed video on the PC's 16 display.

The system 10 and method of the present disclosure significantly simplifies the implementation of a KVM client by exploiting the ability to utilize the WebSocket protocol in HTML5. This enables a single KVM vMedia (KVM appliance or BMC) client to be provided that has the ability to detect what type of video compression is being used, and to select the appropriate decompression engine to decompress the compressed video content. This significantly enriches the browsing experience that can be provided to the user while simplifying the configuration and maintenance of the client. Another advantage is that no updates are required on the user's computer or browser; all the needed code is provided to the browser when the HTML5 client code is served up to the browser at the beginning of a browsing session. The system 10 and method may be used with virtually any number of different types of video compression schemes. And since multiple web sockets can be maintained through the HTML5 client code, the possibility of switching "on the fly" between one type of video compression to a different type of video compression is made possible. A specific advantage could also be realized in another type of system that employs a blade system having a plurality of blade servers. In a blade system the client may be served up by the blade manager (which is a web server), but video may be switched between the various blade servers of the system, each of which may be using a particular video compression scheme. In this configuration essentially one web server would support multiple video servers (BMCs) and servers.

The system 10, while discussed as being embodied in a KVM appliance or a BMC, may be embodied using any type of network device. Thus, for example and without limitation, the system and method of the present disclosure is equally well suited for use with blade system managers.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

The invention claimed is:

1. A method for providing compressed video to a personal electronic device of a user using one of a plurality of different video compression protocols, and wherein the personal electronic device includes a web browser, the method comprising:

using the personal electronic device to transmit a request for video content from a server via a remotely located controller;

using the remotely located controller having a processor and memory to serve up HTML5 client code to the browser;

causing the browser to use the HTML5 client code to create a web socket connection with the server and to establish a web socket in the browser; and using the HTML5 client code, the web socket connection and the web socket to receive the compressed video at the personal electronic device, and to use the HTML5 client code running in the browser to determine a specific type of compression engine being used to compress the compressed video, to select a specific decompression protocol to use to decompress the compressed video, and to decompress the compressed video, using the selected specific decompression protocol, for display on the personal electronic device; and wherein the operation of displaying the video content on the personal electronic device after the compressed video is decompressed, comprises using an HTML5 canvas, provided to the browser in the HTML5 client code, to render the decompressed video.

2. The method of claim 1, wherein the operation of using the remotely located controller to serve up HTML5 client code comprises serving up HTML5 client code including a port number and an address for the server.

3. The method of claim 1, wherein the operation of using the remotely located controller to serve up HTML5 client code comprises serving up HTML5 client code that includes JavaScript code.

4. The method of claim 1, wherein the operation of using the personal electronic device to transmit a request for video content to a server, via a remotely located controller, comprises using the personal electronic device to transmit a request for video content to a server via a remotely located keyboard, video mouse (KVM) appliance.

5. The method of claim 1, wherein the operation of using the personal electronic device to transmit a request for video content to a server, via a remotely located controller, comprises using the personal electronic device to transmit a request for video content to a server via a baseband management controller.

6. The method of claim 1, wherein the specific type of compression engine being used comprises at least one of:
Dambrackas video compression (DVC);
JPEG compression; and
Run Length Encoding (RLE) compression.

7. A method for providing compressed video to a personal electronic device of a user using one of a plurality of different video compression protocols, and wherein the personal electronic device includes a web browser, the method comprising:

using the personal electronic device to transmit a request for video content via a remotely located controller;

using the remotely located controller to serve up HTML5 client code to the web browser of the personal electronic device, the HTML5 client code including a port number and an address for the video server that the personal electronic device requesting video content from;

causing the browser to use the HTML5 client code to establish a web socket connection with the video server using the port number and the address provided in the HTML5 client code, and to establish a web socket in the browser;

using the video server to compress the video content and to provide the video content in compressed form to the browser using the browser's web socket; and causing the personal electronic device to use the HTML5 client code running in the browser to determine a specific type of compression engine being used, from a plurality of different available compression engines, on the received video content, and further using the HTML5 client code running in the browser to decompress the video content using an appropriate decompression protocol, and to render the decompressed video content to a HTML5 canvas of the browser, to enable the browser to display the decompressed video on the user's personal electronic device.

8. The method of claim 7, wherein the serving up HTML5 client code to the browser of the user's personal electronic device comprises serving up HTML5 client code which includes JavaScript code, and wherein the JavaScript code includes the port number and the address for the video server.

9. The method of claim 7, wherein the operation of using the HTML5 client code running in the browser to determine a specific type of compression comprises using JavaScript code included in the HTML5 client code to determine the type of compression engine being used to create the compressed video content received by the browser.

10. The method of claim 9, wherein the operation of rendering the decompressed video content to the browser for display comprises using the JavaScript code to render the decompressed video content to an HTML5 canvas running within the browser.

11. The method of claim 10, wherein the operation of using the personal electronic device to transmit a request for video content via a remotely located controller comprises using the personal electronic device to transmit a request for video content to a remote keyboard, video mouse (KVM) appliance.

12. The method of claim 10, wherein the operation of using the personal electronic device to transmit a request for video content via a remotely located controller comprises using the personal electronic device to transmit a request for video content to a baseband management controller.

13. The method of claim 7, wherein the plurality of different compression engines comprises at least one of:

Dambrackas video compression (DVC);
JPEG compression; and
Run Length Encoding (RLE) compression.

14. A system for providing compressed video to a personal electronic device of a user using one of a plurality of different video compression protocols, and wherein the personal electronic device includes a web browser, the system comprising:
  a remotely located controller having a processor, memory and a HTML5 client code;
  a personal electronic device having a processor and memory configured to:
    transmit a request for video content from a server via the remotely located controller;
    receive from the remotely located controller HTML5 client code, the HTML5 client code including JavaScript code which includes a port number and an address of the server;
    have a browser of the personal electronic device use the HTML5 client code to create a web socket connection with the server and to establish a web socket in the browser;
    use the HTML5 client code, the web socket connection and the web socket to receive the compressed video through the web socket;
    the browser further being configured to use the JavaScript code of the HTML5 client code running within the browser to determine a specific compression engine that was used to compress the compressed video, and to select a specific decompression protocol from a plurality of decompression protocols to use to decompress the compressed video for display on the personal electronic device, and to render the decompressed video to HTML5 canvas running within the browser; and
    the browser further being configured to display the uncompressed video on a display system associated with the personal electronic device.

15. The system of claim 14, wherein the specific compression engine comprises at least one of:
Dambrackas video compression (DVC);
JPEG compression; and
Run Length Encoding (RLE) compression.

* * * * *